US007542982B2

(12) United States Patent
Kalia et al.

(10) Patent No.: US 7,542,982 B2
(45) Date of Patent: Jun. 2, 2009

(54) MESSAGE VALIDATION MODEL

(75) Inventors: Suman Kumar Kalia, Maple (CA); David A. Spriet, Sharon (CA); Hamzeh Zawawy, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 11/469,972

(22) Filed: Sep. 5, 2006

(65) Prior Publication Data
US 2008/0059505 A1    Mar. 6, 2008

(51) Int. Cl.
    G06F 17/30    (2006.01)
(52) U.S. Cl. .............. 707/101; 707/102; 707/E17.127; 715/239
(58) Field of Classification Search .......... 707/E17.127
    See application file for complete search history.

(56) References Cited

U.S. PATENT DOCUMENTS

| 5,202,977 | A | 4/1993 | Pasetes, Jr. et al. |
| 5,909,570 | A | 6/1999 | Webber |
| 6,961,728 | B2 * | 11/2005 | Wynblatt et al. .............. 707/10 |
| 7,194,516 | B2 * | 3/2007 | Giacobbe et al. ............ 709/206 |
| 2002/0103869 | A1 | 8/2002 | Goatly et al. |
| 2002/0111964 | A1 | 8/2002 | Chen et al. |
| 2003/0131071 | A1 | 7/2003 | Bennett et al. |
| 2003/0158854 | A1 | 8/2003 | Yoshida et al. |
| 2004/0068728 | A1 | 4/2004 | Blevins |
| 2004/0225753 | A1 | 11/2004 | Marriott et al. |
| 2005/0010902 | A1 | 1/2005 | Takacsi-Nagy et al. |
| 2005/0060317 | A1 | 3/2005 | Lott et al. |
| 2005/0209989 | A1 * | 9/2005 | Albornoz et al. .............. 707/1 |

OTHER PUBLICATIONS

Mariusz A. Fecko, Christopher M. Lott, XML-based requirements engineering for an electronic clearinghouse, Information and Software Technology, vol. 47, May 31, 2005, pp. 841-858.*

* cited by examiner

Primary Examiner—Hung Q Pham
Assistant Examiner—Albert Phillips
(74) Attorney, Agent, or Firm—Robert Straight; Hoffman Warnick LLC (57) ABSTRACT

The present invention generally provides a message validation model. Specifically, the present invention provides a message validation layer/framework that allows rules such as message validation rules to be plugged into/attached to a logical model. This model allows (among other things) schema level rules or the like to be converted to message level rules at deployment time. Specifically, the rules (like the physical representations) are serialized as annotations on the logical model. From this model, a query (e.g., XSL or XQuery) can be generated to validate and check if the instance documents comply with such rules or a Java based rules execution engine can be developed/utilized that uses XPATH (or another query language) to determine the source and dependent elements and executes the rules.

3 Claims, 4 Drawing Sheets

MESSAGE VALIDATION MODEL

CROSS-REFERENCE TO RELATED APPLICATIONS

This application is related in some aspects to the commonly owned and co-pending application entitled "A Scalable Logical Model for EDI and System and Method for Creating, Mapping and Parsing EDI Messages", filed Sep. 5, 2006, and assigned Ser. No. 11/470,155, the entire contents of which are herein incorporated by reference. This application also is related in some aspects to the commonly owned and co-pending application entitled "A Method, System and Schema for Building a Hierarchical Model Schema Definition from a Flat Model Definition", filed Sep. 5, 2006, and assigned Ser. No. 11/470,146, the entire contents of which are herein incorporated by reference. This application is also related in some aspects to commonly owned, and co-pending published patent application number US 2004-0103071 A1, entitled "Meta-Model for Associating Multiple Physical Representations of Logically Equivalent Entities in Messaging and Other Applications", filed Nov. 6, 2003, and published May 27, 2004, the entire contents of which are herein incorporated by reference.

BACKGROUND OF THE INVENTION

1. Field of the Invention

This application generally relates to message validation. Specifically, the present invention provides a message validation model (that models validation rules prevalent in EDI space but not supported by XML Schema) that converts schema level rules to message level rules.

2. Related Art

Extensible Markup Language (XML), a W3C-recommended general-purpose markup language for creating special-purpose markup languages, while becoming quite popular for a number of reasons including that it is easier for humans to read, has messages which can be quite large. The W3C XML Schema is the industry standard for validating XML document. (For more information relating to XML, see the W3C XML homepage http://www.w3.org/XML/.) While this schema is capable of validating the contents of elements based on their type, the validation functionality lacks in at least the following areas: (1) Coexistence Rules: It is not possible to specify that if a particular element exists in the instance document then a set of other elements must exist and they must have a specific set of values; (2) Multiple Element Rules: It is not possible to specify that a subset of elements defined in a complex type or group must either occur in pairs or only one of them occurs or at most one of them occurs etc.

The above rules are used very widely in the EDI domain. For background, Electronic Data Interchange (EDI) is the computer-to-computer exchange of choice for structured information, by agreed message standards, from one computer application to another by electronic means and with a minimum of human intervention. In common usage, EDI is understood to mean specific interchange methods agreed upon by national or international standards bodies for the transfer of business transaction data, with one typical application being the automated purchase of goods and services. See http://www.unece.org/trade/untdid/welcome.htm (UN/EDIFACT) and http://www.x12.org/ (ANSI ASC X12) for more information. In addition, see the above-incorporated patent applications for additional information.

In any event, in addition to the above rules, there are specific requirement from the messaging domain that are not covered in XML schema or by any related art solution: (1) Valid Values for Element Rule: XML Schema defines enumeration facet on the simple type to constrain the set of values that an element of such simple type can have. The have been instances where customer Document Type Definitions (DTDs) generated for some message sets where the set of valid values for a number of elements were in excess of 2000. The generated XSD was so large the file could not be loaded; and (2) Message Level Rules: A facility to specify Coexistence and Multiple Element rules at the message level. The key distinction between the rules defined at schema level and at message level is that the schema level rules are applicable to all instances created from schema constructs while message levels rules are specific to a particular message only. The following example illustrates the difference:

```
<?xml version="1.0" encoding="UTF-8"?>
<schema xmlns="http://www.w3.org/2001/XMLSchema"
    targetNamespace="http://www.ibm.com"
    xmlns schemaVal="http://www.ibm.com">
    <complexType name="TypeA">
        <sequence>
            <element name="elemA1" type="string" minOccurs="0"></element>
            <element name="elemA2" type="string" minOccurs="0"></element>
            <element name="elemA3" type="string" minOccurs="0"></element>
        </sequence>
    </complexType>
    <complexType name="TypeB">
        <sequence>
            <element name="elemB1" type="string" minOccurs="0"></element>
            <element name="elemB2" type="string" minOccurs="0"></element>
            <element name="elemB3" type="schemaVal:TypeA" minOccurs="0"></element>
        </sequence>
    </complexType>
    <element name="msg_globElemA" type="schemaVal:TypeA">
    </element>
    <element name="msg_globElemB" type="schemaVal:TypeB">
    </element>
</schema>
```

A minOccur (e.g., a minimum occurrence setting) on all elements is set to zero, so from the W3C XML schema validation point of view, msg_globElemA (e.g., message object) can be empty or contain any of the elements elemA1, elemA2, elemA3. A coexistence rule can be defined so that if elemA1 is present in the instance then elemA2 and elemA3 must be present. This rule resides on the elemA1. This is a schema level, meaning that it will be enforced on msg_globElemB as it contains elemB3 of type TypeA; so in the instance if elemB3 is present then it should either have empty contents or all the three elements elemA1, elem A2 and elemA3. If the user had intended to have this rule for the message msg_globElemA and not for msg_globElemB then it should been defined at the message level msg_globElemA. This is the main distinction in defining the rule at schema and the message level as illustrated in the above example.

In view of the foregoing, there exists a need for a solution that solves at least one of the deficiencies of the related art.

SUMMARY OF THE INVENTION

The present invention generally provides a message validation model. Specifically, the present invention extends the teachings of the above-incorporated patent applications(s) by providing a message validation layer/framework that allows rules such as message validation rules to be plugged into/attached to a logical model. This model allows (among other things) schema level rules or the like to be converted to message level rules at deployment time. The message validation model overcomes the current limitations of the XML schema by modeling additional rules/constructs that are not currently supported by XML Schema specification. These constructs, although logical, are modeled in the additional validation layer of the message model provided under the present invention. Specifically, the rules (like the physical representations) are serialized as annotations on the logical model. From this model, a query (e.g., XSL or XQuery) can be generated to validate and check if the instance documents comply with such rules or a Java based rules execution engine can be developed/utilized that uses XPATH (or another query language) to determine the source and dependent elements and executes the rules.

A first aspect of the present invention provides a message validation model for electronic data interchange using a schema having a capability to model structured data, the message validation model comprising: a validation layer comprising a rules base class, a schema level base classes, a rule constraints base class, a coexistence rules class, a message level base class, and a valid rule values base classes; and a message model element adapted to link with the schema level base class, the message model element including a coexistence rule module and a multiple element rule module and valid value rules with values defined external to schema.

In a second aspect of the present invention, the coexistence rule module includes a rule adapted to specify for an existing element, at least one element that must exist and optionally having a required value or range of values depending on the value or range of values of an existing element; and the multiple element rule module is associated with a container and applies to elements within the container and includes a rule adapted to specify paired rules, required rules and exclusive rules.

A third aspect of the present invention provides a computer program product comprising a tangible computer-usable medium having a computer-readable message model program for electronic data interchange using an XML schema, the computer-readable message model program comprising a message model according to the first or second aspects.

A fourth aspect of the present invention provides a computer-implemented method of modelling rules and constructs on a logical model in electronic data interchange using a schema having the capability to model structured data, comprising: serializing pre-defined rules as annotations on a global element in the schema that is marked as a message; generating a query to validate instance documents that are requested to be interchanged; and n a rules execution engine, determining a source and dependent elements, and executing the pre-defined rules using a query language.

A fifth aspect of the present invention provides a computer program product comprising a tangible computer-usable medium having a computer-readable program, wherein the computer-readable program upon being processed on a computer causes the computer to implement the steps of the fourth aspect.

A sixth aspect of the present invention provides a message validation model framework, comprising: a validation system for defining a set pre-defined rules for a schema; a deployment system for converting the set of pre-defined rule from schema level rules to message level rules, and for generating a query to validate instance documents that are requested to be interchanged; and a rules execution engine for executing the pre-defined rules using a query language to determine a source and dependent elements.

A seventh aspect of the present invention provides a computer program product comprising a tangible computer-usable medium having a computer-readable message validation model framework program, the message validation model framework program comprising a message validation model framework according to the first or second aspects.

An eighth aspect of the present invention provides method for deploying a system for modelling rules and constructs on a logical model in electronic data interchange using a schema having the capability to model structured data, comprising: providing a computer infrastructure being operable to: serialize pre-defined rules as annotations on a global element in the schema that is marked as a message; generate a query to validate instance documents that are requested to be interchanged; and in a rules execution engine, determine a source and dependent elements, and executing the pre-defined rules using a query language.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description
II. Computerized Implementation
  A. Validation
    1. Coexistence and Message Level Rules Model
    2. Valid Values for Element Rule Model
    3. Multiple Elements Rule Model
  B. Deployment and Execution I. General Description As indicated above, the present invention generally provides a message validation model. Specifically, the present invention extends the teachings of the above-incorporated patent applications(s) by providing a message validation layer/framework that allows rules such as message validation rules to be plugged into/attached to a logical model. This model allows (among other things) schema level rules or the like to be converted to message level rules at deployment time. The message validation model overcomes the current limitations of the XML schema by modeling additional rules/constructs that are not currently supported by XML Schema specification. These constructs, although logical, are modeled in the additional validation layer of the message model provided under the present invention. Specifically, the rules (like the physical representations) are serialized as annotations on the logical model. From this model, a query (e.g., XSL or XQuery) can be generated to validate and check if the instance documents comply with such rules or a Java based rules execution engine can be developed/utilized that uses XPATH (or another query language) to determine the source and dependent elements and executes the rules. In providing this functionality, the present invention also provides a facility to specify a set of discrete valid values or a range of valid values for an element in a database table.

II. Computerized Implementation

Figure 1:
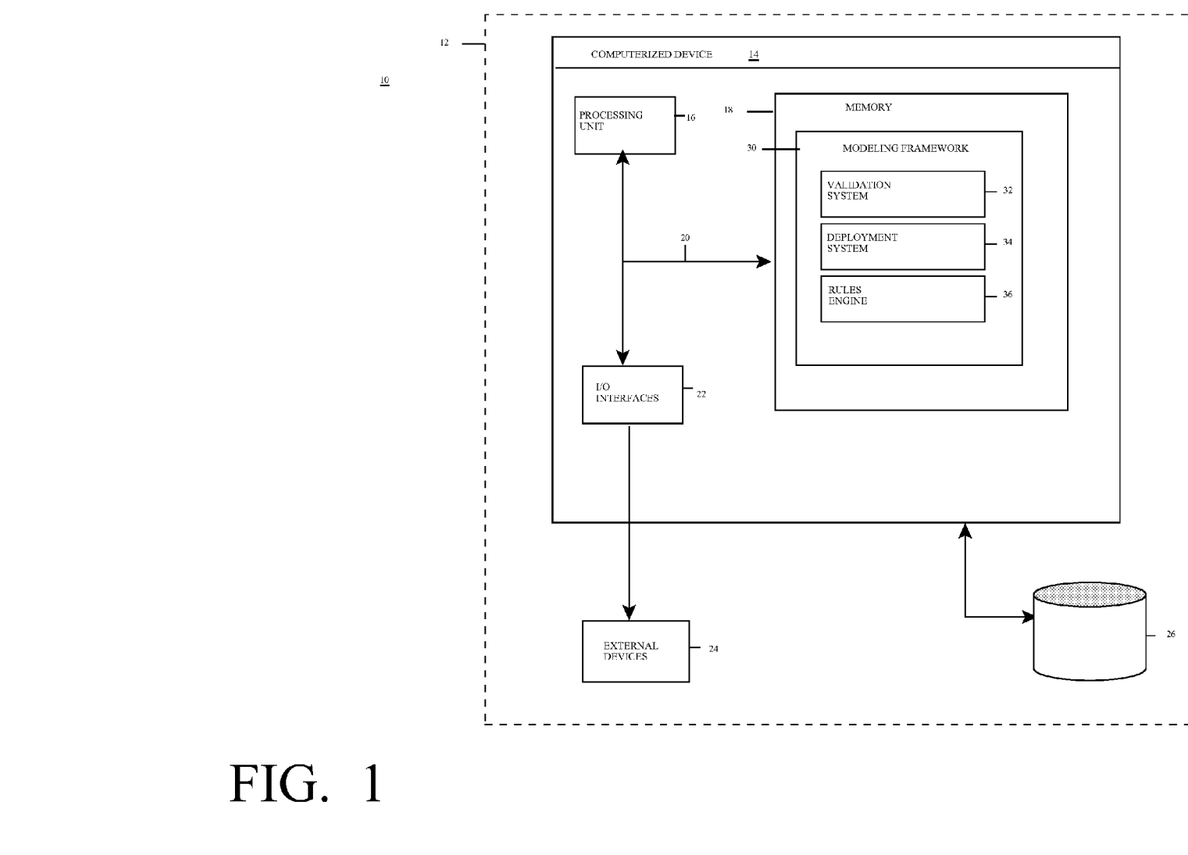
FIG. 1 depicts a system for developing and/or deploying a message validation model, according to the present invention.

Referring now to FIG. 1, a message validation model (hereinafter model 10) according to the present invention is shown. As depicted, model 10 includes computer system 14 deployed within a computer infrastructure/environment 12. This is intended to demonstrate, among other things, that some or all of the teachings of the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of model 10 could be deployed, managed, serviced, etc. by a service provider who offers to provide validate messages according to the present invention.

As shown, computer system 14 includes a processing unit 16, a memory 18, a bus 20, and input/output (I/O) interfaces 22. Further, computer system 14 is shown in communication with external I/O devices/resources 24 and storage system 26. In general, processing unit 16 executes computer program code, such as message validation model framework/program 30, which are stored in memory 18 and/or storage system 26. While executing computer program code, processing unit 16 can read and/or write data to/from memory 18, storage system 26, and/or I/O interfaces 22. Bus 20 provides a communication link between each of the components in computer system 14. External devices 24 can comprise any devices (e.g., keyboard, pointing device, display, etc.) that enable a user to interact with computer system 14 and/or any devices (e.g., network card, modem, etc.) that enable computer system 14 to communicate with one or more other devices.

Computer infrastructure 12 is only illustrative of various types of computer infrastructures for implementing the invention. For example, in one embodiment, computer infrastructure 12 comprises two or more devices (e.g., a server cluster) that communicate over a network to perform the various process of the invention. Moreover, computer system 14 is only representative of various possible computer systems that can include numerous combinations of hardware. To this extent, in other embodiments, computer system 14 can comprise any specific purpose article of manufacture comprising hardware and/or computer program code for performing specific functions, any article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or storage system 26 can comprise any combination of various types of data storage and/or transmission media that reside at one or more physical locations. Further, I/O interfaces 22 can comprise any system for exchanging information with one or more external devices 24. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 24 (e.g., a display) and/or storage system 26 could be contained within computer system 14, not externally as shown.

Storage system 26 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown).

Shown in memory 18 of computer system 14 is message validation model framework/program 30, which includes validation system 32, (optional) deployment system 34, and rules engine 36. Framework/program 30 provides the functionality of the present invention. It should be understood that the configuration of systems of FIG. 1 is shown as such for illustrative purposes only, and that the same functionality could be implemented with a different configuration of systems. IN any event, these systems will be described in more detail in the sub sections set forth below.

A. Validation

Figure 2:
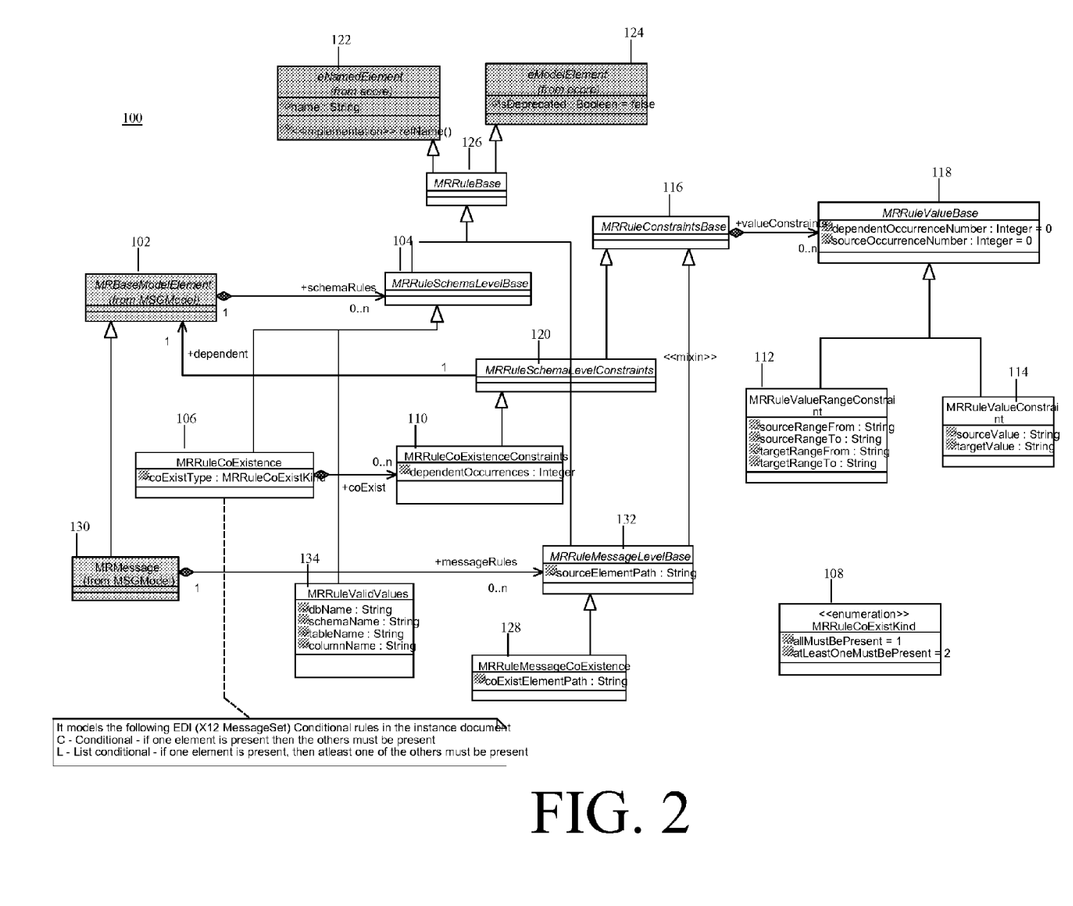
FIG. 2 depicts a validation model framework/layer according to the repent invention.
Figure 3:
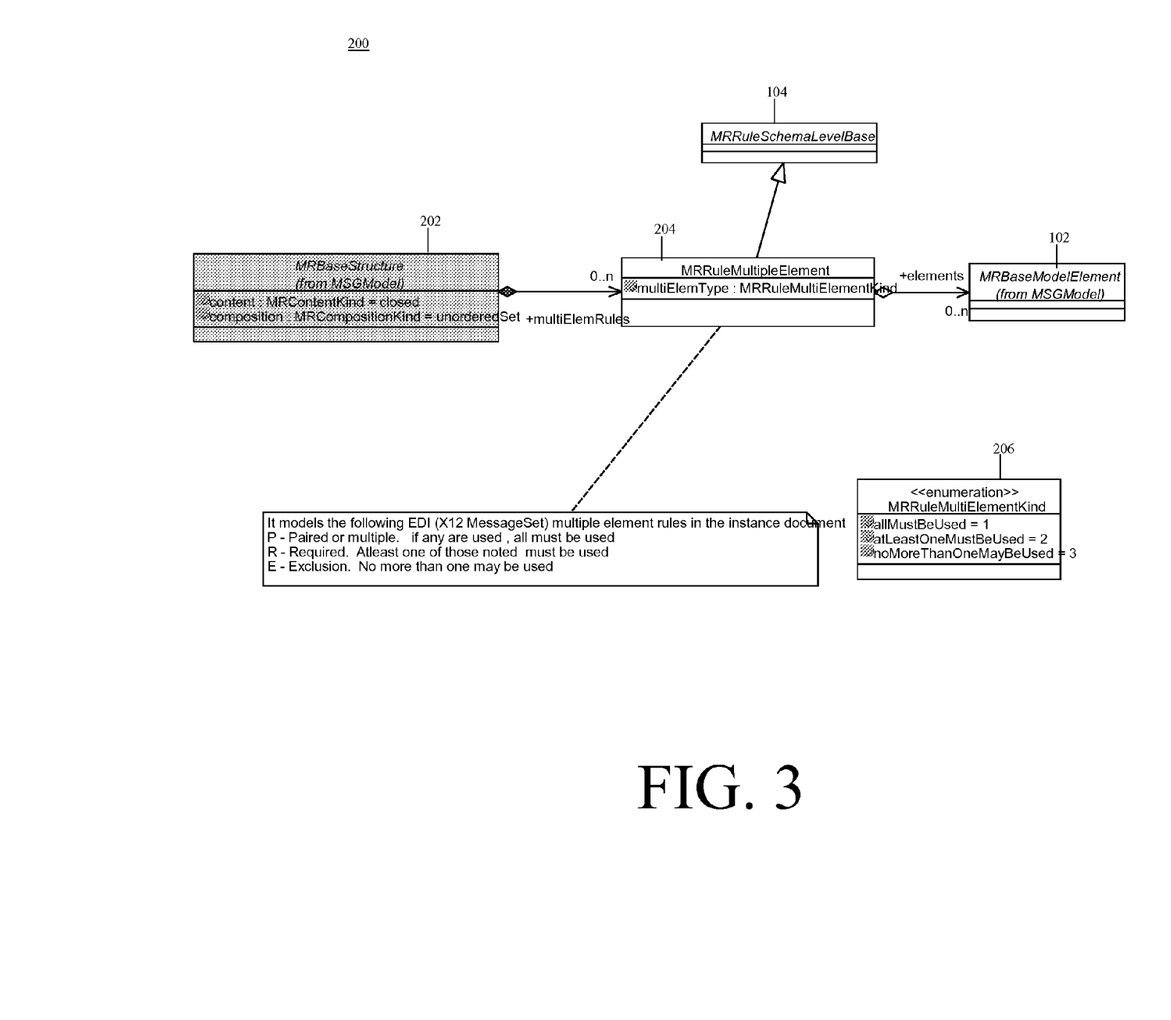
FIG. 3 depicts a multiple elements rule model according to the present invention.

Model 10 provides an extension to the base framework developed for WBIMB Message model. Specifically, validation system 30 provides a validation framework/layer and performs and/or facilitates the functions set forth in this section. To better describe such functionality, reference will be made to FIGS. 1-3 collectively. FIGS. 2 and 3 shows the validation layer/framework 100 and a multiple element framework 200 (respectively) as a series of interconnected "objects" representing models, classes (e.g., base classes), rules, enumerations, ranges, values, etc. In general, the present invention (e.g., validation system 32) utilizes a base set of classes defined in the message model that provide a linkage between a logical model and a physical model (e.g. MRBaseModelElement class 102 of FIG. 1 is the base class that provides a linkage between XML schema elements and attribute level constructs; MRBaseStructure class 202 of FIG. 3 provides linkage between grouping constructs of schema such as complex types and groups.

1. Coexistence and Message Level Rules Model

Referring specifically to FIG. 1, the validation model layer/framework 100 for coexistence rules (at schema level) and rules at the message level will be described in greater detail. The black diamond association "schemaRules" from MRBaseModelElement class 102 to MRRuleSchemaLevelBase class 104 (a schema level base class) permits rules to be defined on almost any construct of schema and serialized as an annotation (e.g., in mxsd). As further shown in FIG. 2, MRRuleCoExistence class 106 inherits from MRRuleSchemaLevelBase class 104 and MRRuleCoExistenceConstraints class 110 inherits from MRRuleSchemaLevelConstraints class 120. The dependent association from MRRuleSchemaLevelConstraints class 120 to MRBaseModelElement class 102 identifies a dependent element for co-existence rule. The coexistence rules set forth any coexistence requirements among elements. (e.g., if element A is present, then elements B and C must be as well. Co-existence types are defined in MRRuleCoExistKind class 108.

MRRuleCoExistenceConstraints class 110 identifies any repeating/occurrence requirements for elements (e.g., typically in integer form). For example, if element A could be repeating a certain number of times. Along these lines, sources and/or target values for occurrences would be identified in as ranges or specific values in MRRuleValueRangeConstraint class 112 and MRRuleValueConstraint class 114, respectively. Thus, model 10 and framework 100 allows multiple set of coexistence rules on elements to be defined, and each of the coexistence rules can have value constraints on a specific occurrence of the dependent element.

As further shown, MRRuleCoExistence class 106 models the coexistence rules and association "coexist" from it to MRRuleCoExistenceConstraints class 110 defines a set of dependents for the rule. The set of constraints applied to each of the dependent are modeled through the association "valueConstraints" from MRRuleConstraintBase class 116 to MRRuleValueBase class 118. For the example defined before, it is possible to define following co-existence rules:

If elemA 1 is present then
  elemA2 must be present and it must have at east 2 occurrences and optionally it's
    first occurrence must have a value "XXX" if elemA1 first occurrence has value "AAA"
    second occurrence must have a value "YYY" if elemA1 second occurrence has value "BBB"
  elemA3 must be present and it must have at least 2 occurrence and optionally it's
    first occurrence must have a value "PPP" if elemA1 first occurrence has value "AAA"
    second occurrence must have a value "QQQ" if elemA1 second occurrence has value "BBB"
  if elemA2 is present then
  elemA3 must be present and optionally it's
    first occurrence must have a value "RRR" if elemA2 first occurrence has a value "LLL"

In addition, a message level rule for the msg_globElemB message can specify that elemB3\elemA1 first occurrence has a value "CCC" then elemB3\elemA2 must have a value "ZZZ".

As further shown, FIG. 2 also depicts an eNamedElement class 122 and an eModelElement class 124, which inherit from an MRRuleBase class 126 (e.g., a rules base class); a MRRuleMessageLevelbase class 132 (a message level base class); a MRRuleValidValues class 134 (a valid rule values base class); a MRRuleMessageCoExistence class 128; and a MRMessage class 130. MRRuleMessageCoExistence class models co-existence rules at message level.

2. Valid Values for Element Rule Model

MRRuleValidValues class 134 models the above illustrative rule. That is, it provides all the information necessary to access the database table containing the set of valid values.

3. Multiple Elements Rule Model

Referring specifically to FIG. 3, multiple element framework 200 is shown. Under the present invention, multiple element rules can be specified at a MRComplexType class, a MRLocalGroup class, and a MRGlobalGroup class (the corresponding schema objects are complex type, local and global groups). MRBaseStructue class 202 is the super class of the above classes and association of "multiElemRules" from it to MRRuleMultipleElement class 204 allows the multiple element rules to be serialized as annotations on the above objects. MRRuleMultipleElement class 204 groups together a set of elements on which the multiple element rule is applied. An enumeration set of rules for rule types or kinds of the message elements is set forth in MRRuleMultiElementKind class 206.

B. Deployment and Execution

Figure 4:
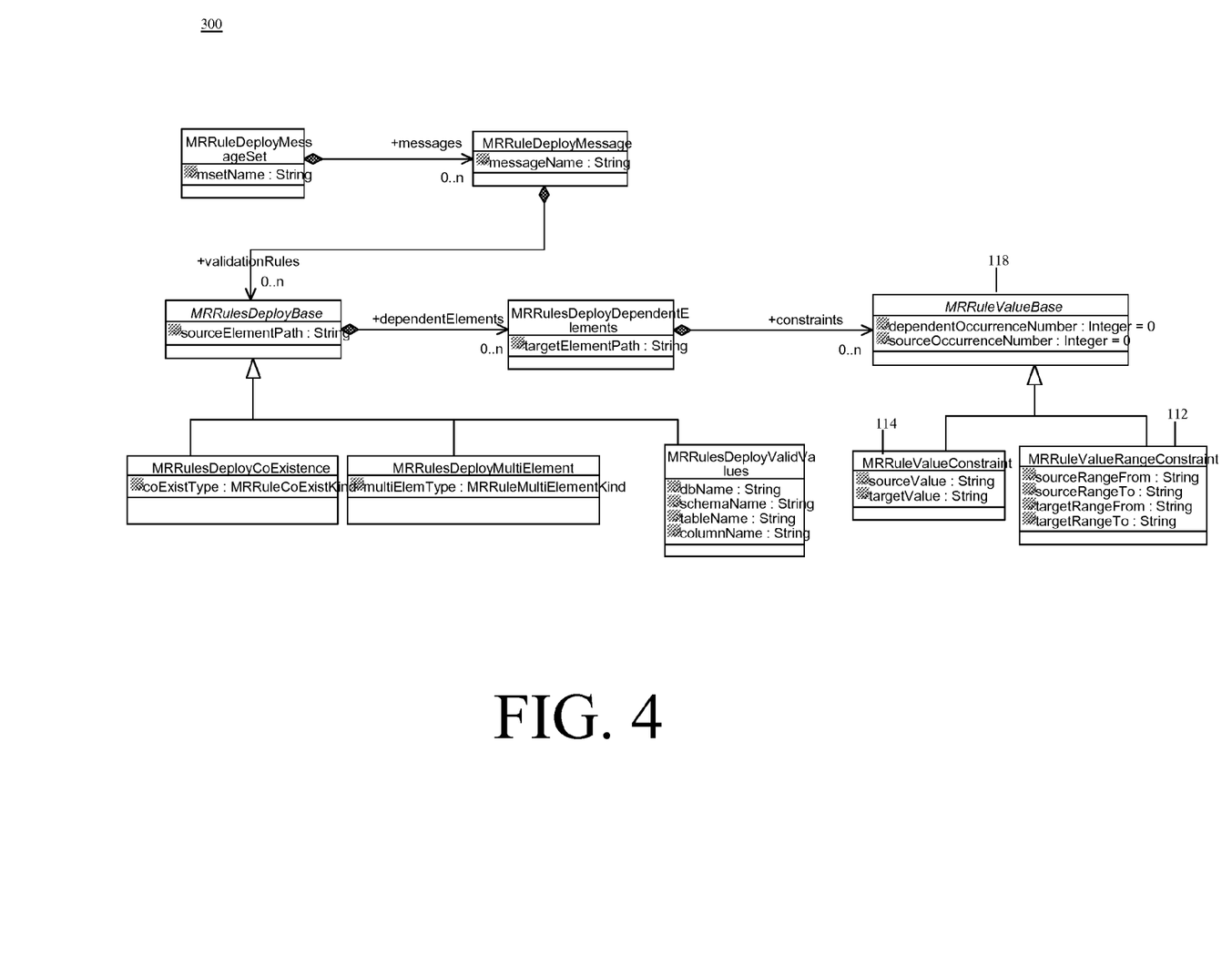
FIG. 4 depicts an optional rules deployment model according to the present invention.

Referring collectively to FIGS. 1 and 4, one optional illustration of the deployment phase of the present invention will be described. In general, the deployment functions are provided by deployment system 34 and rules execution engine 36. FIG. 4 shows a deployment layer/framework 300 as provided by deployment system 34 under the present invention. During the deployment of validation model, the schema level rules are converted to message level rules because that is what should be validated at runtime.

The algorithm for converting schema level rules to messagelLevel rules obtains a list of all messages defined in the message set. Deployment system 34 "walks" the contents of each message and for any schema level rules encountered on the elements or complex types or groups. It then obtains the XPATH of the source and dependent element along with a set of constraints to be applied to the dependent element and populates the deployment model. The populated deployment model with the message level rules is serialized as XMI file. One possible name for the file is: <messageSetName>ExtrendedValidation.xmi. Shown below is illustrative code for this file:

```
<MSGValidation:MRRuleDeployMessageSet xmi:version="2.0"
xmlns:xmi="http://www.omg.org/XMI" xmlns:MSGValidation="MSGValidation.xmi"
xmi:id="MRRuleDeployMessageSet_1" msetName="MessageValidationModelMSet">
    <messages xmi:id="MRRuleDeployMessage_1" messageName="msg_globElemA">
        <validationRules xmi:type="MSGValidation:MRRulesDeployCoExistence"
xmi:id="MRRulesDeployCoExistence_1" sourceElementPath="/elemA1"
coExistType="allMustBePresent">
            <dependentElements xmi:id="MRRulesDeployDependentElements_1"
targetElementPath="/elemA2">
                <constraints xmi:type="MSGValidation:MRRuleValueConstraint"
xmi:id="MRRuleValueConstraint_1" dependentOccurrenceNumber="0"
sourceOccurrenceNumber="0" sourceValue="AAA" targetValue="XXX"/>
                <constraints xmi:type="MSGValidation:MRRuleValueConstraint"
xmi:id="MRRuleValueConstraint_2" dependentOccurrenceNumber="1"
```

-continued

```
sourceOccurrenceNumber="1" sourceValue="BBB" targetValue="YYY"/>
        </dependentElements>
        <dependentElements xmi:id="MRRulesDeployDependentElements_2"
targetElementPath="/elemA3">
            <constraints xmi:type="MSGValidation:MRRuleValueConstraint"
xmi:id="MRRuleValueConstraint_3" dependentOccurrenceNumber="0"
sourceOccurrenceNumber="0" sourceValue="AAA" targetValue="PPP"/>
            <constraints xmi:type="MSGValidation:MRRuleValueConstraint"
xmi:id="MRRuleValueConstraint_4" dependentOccurrenceNumber="1"
sourceOccurrenceNumber="1" sourceValue="BBB" targetValue="QQQ"/>
        </dependentElements>
    </validationRules>
    <validationRules xmi:type="MSGValidation:MRRulesDeployCoExistence"
        xmi:id="MRRulesDeployCoExistence_2" sourceElementPath="/elemA2"
coExistType="allMustBePresent">
        <dependentElements xmi:id="MRRulesDeployDependentElements_3"
targetElementPath="/elemA3">
            <constraints xmi:type="MSGValidation:MRRuleValueConstraint"
xmi:id="MRRuleValueConstraint_5" dependentOccurrenceNumber="0"
sourceOccurrenceNumber="0" sourceValue="LLL" targetValue="RRR"/>
        </dependentElements>
    </validationRules>
</messages>
<messages xmi:id="MRRuleDeployMessage_2" messageName="msg_globElemB">
    <validationRules xmi:type="MSGValidation:MRRulesDeployCoExistence"
xmi:id="MRRulesDeployCoExistence_3" sourceElementPath="/elemB3/elemA1"
coExistType="allMustBePresent">
        <dependentElements xmi:id="MRRulesDeployDependentElements_4"
targetElementPath="/elemB3/elemA2">
            <constraints xmi:type="MSGValidation:MRRuleValueConstraint"
xmi:id="MRRuleValueConstraint_6" dependentOccurrenceNumber="0"
sourceOccurrenceNumber="0" sourceValue="AAA" targetValue="XXX"/>
            <constraints xmi:type="MSGValidation:MRRuleValueConstraint"
xmi:id="MRRuleValueConstraint_7" dependentOccurrenceNumber="1"
sourceOccurrenceNumber="1" sourceValue="BBB" targetValue="YYY"/>
        </dependentElements>
        <dependentElements xmi:id="MRRulesDeployDependentElements_5"
targetElementPath="/elemB3/elemA3">
            <constraints xmi:type="MSGValidation:MRRuleValueConstraint"
xmi:id="MRRuleValueConstraint_8" dependentOccurrenceNumber="0"
sourceOccurrenceNumber="0" sourceValue="AAA" targetValue="PPP"/>
            <constraints xmi:type="MSGValidation:MRRuleValueConstraint"
xmi:id="MRRuleValueConstraint_9" dependentOccurrenceNumber="1"
sourceOccurrenceNumber="1" sourceValue="BBB" targetValue="QQQ"/>
        </dependentElements>
    </validationRules>
    <validationRules xmi:type="MSGValidation:MRRulesDeployCoExistence"
xmi:id="MRRulesDeployCoExistence_4" sourceElementPath="/elemB3/elemA2"
coExistType="allMustBePresent">
        <dependentElements xmi:id="MRRulesDeployDependentElements_6"
targetElementPath="/elemB3/elemA3">
            <constraints xmi:type="MSGValidation:MRRuleValueConstraint"
xmi:id="MRRuleValueConstraint_10" dependentOccurrenceNumber="0"
sourceOccurrenceNumber="0" sourceValue="LLL" targetValue="RRR"/>
        </dependentElements>
    </validationRules>
    <validationRules xmi:type="MSGValidation:MRRulesDeployMultiElement"
xmi:id="MRRulesDeployMultiElement_1" multiElemType="allMustBeUsed">
        <dependentElements xmi:id="MRRulesDeployDependentElements_7"
targetElementPath="/elemB1"/>
        <dependentElements xmi:id="MRRulesDeployDependentElements_8"
targetElementPath="/elemB3"/>
    </validationRules>
    <validationRules xmi:type="MSGValidation:MRRulesDeployMultiElement"
xmi:id="MRRulesDeployMultiElement_2" multiElemType="atLeastOneMustBeUsed">
        <dependentElements xmi:id="MRRulesDeployDependentElements_9"
targetElementPath="/elemB1"/>
        <dependentElements xmi:id="MRRulesDeployDependentElements_10"
targetElementPath="/elemB2"/>
    </validationRules>
    <validationRules xmi:type="MSGValidation:MRRulesDeployCoExistence"
xmi:id="MRRulesDeployCoExistence_5" sourceElementPath="/elemB3/elemA1"
coExistType="allMustBePresent">
        <dependentElements xmi:id="MRRulesDeployDependentElements_11"
targetElementPath="/elemB3/elemA2">
            <constraints xmi:type="MSGValidation:MRRuleValueConstraint"
```

-continued

```
xmi:id="MRRuleValueConstraint_11" dependentOccurrenceNumber="0"
sourceOccurrenceNumber="0" sourceValue="CCC" targetValue="ZZZ"/>
        </dependentElements>
      </validationRules>
   </messages>
</MSGValidation:MRRuleDeployMessageSet>
```

In any event, a message validation plug-in node can be developed to execute the validation rules. This is shown as rules execution engine 36 in FIG. 1. The user will have to set following properties on the validation plug-in node: (1) messageSetName; and (2) MessageName. Rules execution engine 36 is typically Java based, can loads a file referred to herein as the <messageSetName>ExtrendedValidation.xmi file, and extracts the validation rules for the message. It selects the source and dependent elements in the message tree using XPATH (or another language) as described above and executes the rules.

Below is a sample of validation rules described in the model serialized as annotations on the schema example described above:

```
<?xml version="1.0" encoding="UTF-8"?>
<schema targetNamespace="http://www.ibm.com"
   xmlns="http://www.w3.org/2001/XMLSchema"
xmlns:schemaVal="http://www.ibm.com">
   <complexType name="TypeA">
      <sequence>
         <element maxOccurs="unbounded" minOccurs="0" name="elemA1"
type="string">
            <annotation>
               <appinfo source="WMQI_APPINFO">
                  <schemaRule coExistType="allMustBePresent">
                     <coExistConstraint
dependent="/TypeA;XSDComplexTypeDefinition/XSDParticle/XSDModelGroup/XSDP
article=1/elemA2;XSDElementDeclaration/$MRObject" dependentOccurrences="2">
                        <valueConstraint
                           dependentOccurrenceNumber="0"
                           sourceOccurrenceNumber="0"
                           sourceValue="AAA" targetValue="XXX"/>
                        <valueConstraint
                           dependentOccurrenceNumber="1"
                           sourceOccurrenceNumber="1"
                           sourceValue="BBB" targetValue="YYY"/>
                     </coExistConstraint>
                     <coExistConstraint
dependent="/TypeA;XSDComplexTypeDefinition/XSDParticle/XSDModelGroup/XSDP
article=2/elemA3;XSDElementDeclaration/$MRObject" dependentOccurrences="2">
                        <valueConstraint
                           dependentOccurrenceNumber="0"
                           sourceOccurrenceNumber="0"
                           sourceValue="AAA" targetValue="PPP"/>
                        <valueConstraint
                           dependentOccurrenceNumber="1"
                           sourceOccurrenceNumber="1"
                           sourceValue="BBB" targetValue="QQQ"/>
                     </coExistConstraint>
                  </schemaRule>
               </appinfo>
            </annotation>
         </element>
         <element maxOccurs="unbounded" minOccurs="0" name="elemA2"
type="string">
            <annotation>
               <appinfo source="WMQI_APPINFO">
                  <schemaRule coExistType="allMustBePresent">
                     <coExistConstraint
dependent="/TypeA;XSDComplexTypeDefinition/XSDParticle/XSDModelGroup/XSDP
article=2/elemA3;XSDElementDeclaration/$MRObject">
                        <valueConstraint
                           dependentOccurrenceNumber="0"
                           sourceOccurrenceNumber="0"
                           sourceValue="LLL" targetValue="RRR"/>
                     </coExistConstraint>
                  </schemaRule>
               </appinfo>
            </annotation>
```

```
        </element>
        <element minOccurs="0" name="elemA3" type="string"/>
      </sequence>
    </complexType>
    <complexType name="TypeB">
      <annotation>
        <appinfo source="WMQI_APPINFO">
          <multiElemRule multiElemType="allMustBeUsed">
            <element
ref="/TypeB;XSDComplexTypeDefinition=1/XSDParticle/XSDModelGroup/XSDParticle
/elemB1;XSDElementDeclaration/$MRObject"/>
            <element
ref="/TypeB;XSDComplexTypeDefinition=1/XSDParticle/XSDModelGroup/XSDParticle
=2/elemB3;XSDElementDeclaration/$MRObject"/>
          </multiElemRule>
          <multiElemRule multiElemType="atLeastOneMustBeUsed">
            <element
ref="/TypeB;XSDComplexTypeDefinition=1/XSDParticle/XSDModelGroup/XSDParticle
/elemB1;XSDElementDeclaration/$MRObject"/>
            <element
ref="/TypeB;XSDComplexTypeDefinition=1/XSDParticle/XSDModelGroup/XSDParticle
=1/elemB2;XSDElementDeclaration/$MRObject"/>
          </multiElemRule>
        </appinfo>
      </annotation>
      <sequence>
        <element minOccurs="0" name="elemB1" type="string"/>
        <element minOccurs="0" name="elemB2" type="string"/>
        <element minOccurs="0" name="elemB3" type="schemaVal:TypeA"/>
      </sequence>
    </complexType>
    <element name="msg_globElemA" type="schemaVal:TypeA">
      <annotation>
        <appinfo source="WMQI_APPINFO">
          <MRMessage
messageDefinition="/msg_globElemA;XSDElementDeclaration/$MRObject"/>
        </appinfo>
      </annotation>
    </element>
    <element name="msg_globElemB" type="schemaVal:TypeB">
      <annotation>
        <appinfo source="WMQI_APPINFO">
          <MRMessage
messageDefinition="/msg_globElemB;XSDElementDeclaration=1/$MRObject"/>
          <MRRuleMessageCoExistence_messageRules
            coExistElementPath="/elemB3/elemA2"
sourceElementPath="/elemB3/elemA1">
            <valueConstraint dependentOccurrenceNumber="0"
              sourceOccurrenceNumber="0" sourceValue="CCC" targetValue="ZZZ"/>
          </MRRuleMessageCoExistence_messageRules>
        </appinfo>
      </annotation>
    </element>
</schema>
```

Therefore, message validation framework 10 provides an infrastructure for modeling validation rules which are used pervasively in the EDI and messaging domains. The base set of rule classes provided in the framework can easily be extended to provide support for custom and more complex rules in the future. The rules are serialized as annotations on XML schema and this extension fits quite naturally with the Message model. If in the future new standards are developed or the XML schema is enhanced to address such validation rules, the model serializer can easily be enhanced/modified to serialize the rules in a format expected by the standard and likewise the model, as described, can be easily be built from an external serialization format by building/modifying the rules loader.

While shown and described herein as message validation model, it is understood that the invention further provides various alternative embodiments. For example, in one embodiment, the invention provides a computer-readable/useable medium that includes computer program code to enable a computer infrastructure to validate messages. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to validate messages. In this case, the service provider can create, maintain, deploy, support, etc., a computer infrastructure, such as computer infrastructure 12 (FIG. 1) that performs the process of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for validating messages. In this case, a computer infrastructure, such as computer infrastructure 12 (FIG. 1), can be provided and one or more systems for performing the process of the invention can be obtained (e.g., created, purchased, used, modified, etc.) and deployed to the computer infrastructure. To this extent, the deployment of a system can comprise one or more of (1) installing program code on a device, such as computer system 14 (FIG. 1), from a computer-readable medium; (2) adding one or more devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/Output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer program embedded in a computer readable storage medium and executed by a computer processor for electronic data interchange, the executed computer program performing the steps comprising:

defining a message validation model using a schema, wherein the defined message validation model includes:
   a validation layer comprising a rules base class, a schema level base classes, a rule constraints base class, a coexistence rules class, a message level base class, and a valid rule values base classes;
   a message model element, wherein the message model element is linked with the schema level base class, the message model element including a coexistence rule module and a multiple element rule module and valid value rules with values defined external to the schema;
   a set of message level rules, wherein the set of message level rules allows two distinct messages based on the schema to be enforced differently from one another;

defining a set of pre-defined rules for the schema, wherein the set of predefined rules includes a set of coexistence rules, a set of valid value rules, and a set of message level rules and multi element rules;

defining a deployment model, wherein the defined deployment model converts the set of pre-defined rules from schema level rules to message level rules, and obtaining an XPATH of a source and a dependent element along with a set of constraints to be applied to the dependent element;

populating the defined deployment model;

serializing the populated deployment model with the set of message level rules as an XMI file;

generating a query to validate instance documents that are requested to be interchanged based on the defined message validation model and the set of pre-defined rules;

executing the set of pre-defined rules using a query language to determine a source and dependent elements;

wherein the coexistence rule module includes a rule that specifies for a first existing element, at least one element that must exist and optionally having a required value or range of values depending on the value or range of values of the first existing element;

wherein the multiple element rule module is associated with a container and applies to elements within the container and includes a rule that specifies paired rules, required rules and exclusive rules; and wherein the set of valid value rules specifies a set of valid values for a second existing element defined externally in a database table column.

2. A computer-implemented method of modeling rules and constructs on a logical model in electronic data interchange using a schema having the capability to model structured data, comprising:

defining a message validation model, in a computer system, using a schema, wherein the defined message validation model includes:

a validation layer comprising a rules base class, a schema level base classes, a rule constraints base class, a coexistence rules class, a message level base class, and a valid rule values base classes;

a message model element, wherein the message model element is linked with the schema level base class, the message model element including a coexistence rule module and a multiple element rule module and valid value rules with values defined external to the schema a set of message level rules, wherein the set of message level rules allows two distinct messages based on the schema to be enforced differently from one another;

defining a set of pre-defined rules for the schema, wherein the set of predefined rules includes a set of coexistence rules, a set of valid value rules, and a set of message level rules and multi element rules;

defining a deployment model, in the computer system, wherein the defined deployment model converts the set of pre-defined rules from schema level rules to message level rules, and obtaining an XPATH of a source and a dependent element along with a set of constraints to be applied to the dependent element;

populating the defined deployment model;

serializing the populated deployment model with the set of message level rules as an XMI file; generating a query to validate instance documents that are requested to be interchanged based on the defined message validation model and the set of pre-defined rules;

executing the set of pre-defined rules using a query language to determine a source and dependent elements;

wherein the coexistence rule module includes a rule that specifies a first existing element, at least one element that must exist and optionally having a required value or range of values depending on the value or range of values of the first existing element;

wherein the multiple element rule module is associated with a container and applies to elements within the container and includes a rule that specifies paired rules, required rules and exclusive rules; and wherein the set of valid value rules specifies a set of valid values for a second existing element defined externally in a database table column.

3. A computer system for electronic data interchange comprising:

a computer processor;

an application program embedded in a computer readable storage medium executed by the computer processor wherein the application program comprises:

means for defining a message validation model, in a computer system, using a schema, wherein the defined message validation model includes:

a validation layer comprising a rules base class, a schema level base classes, a rule constraints base class, a coexistence rules class, a message level base class, and a valid rule values base classes;

a message model element, wherein the message model element is linked with the schema level base class, the message model element including a coexistence rule module and a multiple element rule module and valid value rules with values defined external to the schema a set of message level rules, wherein the set of message level rules allows two distinct messages based on the schema to be enforced differently from one another;

means for defining a set of ore-defined rules for the schema, wherein the set of predefined rules includes a set of coexistence rules, a set of valid value rules, and a set of message level rules and multi element rules;

means for defining a deployment model, in the computer system, wherein the defined deployment model converts the set of pre-defined rules from schema level rules to message level rules, and obtaining an XPATH of a source and a dependent element along with a set of constraints to be applied to the dependent element;

means for populating the defined deployment model;

means for serializing the populated deployment model with the set of message level rules as an XMI file; generating a query to validate instance documents that are requested to be interchanged based on the defined message validation model and the set of pre-defined rules;

means for executing the set of pre-defined rules using a query language to determine a source and dependent elements;

wherein the coexistence rule module includes a rule that specifies for a first existing element, at least one element that must exist and optionally having a required value or range of values depending on the value or range of values of the first existing element;

wherein the multiple element rule module is associated with a container and applies to elements within the container and includes a rule that specifies paired rules, required rules and exclusive rules; and wherein the set of valid value rules specifies a set of valid values for a second existing element defined externally in a database table column.

* * * * *